United States Patent
Yoshida et al.

(10) Patent No.: US 9,005,481 B2
(45) Date of Patent: Apr. 14, 2015

(54) METHOD FOR MANUFACTURING COMPOSITE POSITIVE ELECTRODE ACTIVE MATERIAL

(75) Inventors: Satoshi Yoshida, Toyota (JP); Hiroki Kubo, Nisshin (JP); Masahiro Iwasaki, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 262 days.

(21) Appl. No.: 13/522,248
(22) PCT Filed: Jan. 14, 2011
(86) PCT No.: PCT/IB2011/000051
§ 371 (c)(1),
(2), (4) Date: Jul. 13, 2012
(87) PCT Pub. No.: WO2011/086457
PCT Pub. Date: Jul. 21, 2011

(65) Prior Publication Data
US 2013/0146819 A1 Jun. 13, 2013

(30) Foreign Application Priority Data
Jan. 15, 2010 (JP) .................. 2010-006903

(51) Int. Cl.
*H01B 1/04* (2006.01)
*H01M 4/62* (2006.01)
(Continued)

(52) U.S. Cl.
CPC .............. *H01M 4/625* (2013.01); *B82Y 30/00* (2013.01); *B82Y 40/00* (2013.01); *C01B 25/45* (2013.01);
(Continued)

(58) Field of Classification Search
CPC ..................................................... H01M 4/62
USPC ............ 252/502, 518.1, 521.2; 429/217, 221, 429/231.8
See application file for complete search history.

(56) References Cited

U.S. PATENT DOCUMENTS

2009/0305135 A1* 12/2009 Shi et al. .................. 429/217
2010/0230641 A1* 9/2010 Oki et al. .................. 252/502

FOREIGN PATENT DOCUMENTS

CN 101546828 A 9/2009
CN 101546830 A 9/2009
(Continued)

OTHER PUBLICATIONS

Chen J et al: "Hydrothermal synthesis of cathode materials", Journal of Power Sources, Elsevier SA, CH, vol. 174, No. 2, Dec. 6, 2007, pp. 442-448, XP025917579, ISSN: 0378-7753, DOI DOI:10.1016/J.JPOWSOUR.2007.06.189.
Bandyopadhyaya Rajdip et al: "Stabilization of individual carbon nanotubes in aqueous solutions", Nano Letters, ACS, Washington, DC, US, vol. 2, No. 1, Jan. 1, 2002, pp. 25-28, XP002206255, ISSN: 1530-6984, DOI: DOI:10.1021/NL010065F, pp. 25-27.
(Continued)

*Primary Examiner* — Khanh Tuan Nguyen
(74) *Attorney, Agent, or Firm* — Sughrue Mion, PLLC

(57) ABSTRACT

The invention relates to a method for manufacturing a composite positive electrode active material being a composite of a positive electrode active material and carbon nanotubes. The manufacturing method includes preparing an aqueous solution of a starting material of a positive electrode active material containing a starting material of the positive electrode active material, and an aqueous solution of solubilized carbon nanotubes containing the carbon nanotubes and a solubilizing material that is composed of a water-soluble polymer whose solubilization retention rate of carbon nanotubes does not decrease with rising temperature; and synthesizing a positive electrode active material-carbon nanotube composite by mixing the aqueous solution of a starting material of a positive electrode active material and the aqueous solution of solubilized carbon nanotubes, and performing hydrothermal synthesis.

5 Claims, 4 Drawing Sheets

(51) Int. Cl.
- *B82Y 30/00* (2011.01)
- *B82Y 40/00* (2011.01)
- *C01B 25/45* (2006.01)
- *C01B 31/02* (2006.01)
- *H01M 4/36* (2006.01)
- *H01M 4/58* (2010.01)
- *H01M 10/052* (2010.01)

(52) U.S. Cl.
CPC ............ *C01B 31/0273* (2013.01); *H01M 4/36* (2013.01); *H01M 4/5825* (2013.01); *H01M 10/052* (2013.01); *Y02E 60/122* (2013.01)

(56) References Cited

FOREIGN PATENT DOCUMENTS

| | | | | |
|---|---|---|---|---|
| EP | WO 2008-001792 A1 * | 1/2008 | ........ | H01M 10/0525 |
| JP | 2005-123107 A | 5/2005 | | |
| JP | 2008-34376 A | 2/2008 | | |
| JP | 2008-130526 A | 6/2008 | | |
| JP | 2009-81072 A | 4/2009 | | |

OTHER PUBLICATIONS

O'Connell M J et al: "Reversible water-solubilization of single-walled carbon nanotubes by polymer wrapping", Chemical Physics Letters, North-Holland, Amsterdam, NL, vol. 342, No. 3-4, Jul. 13, 2001, pp. 265-271, XP027291782, ISSN: 0009-2614.

Mori Takahiro et al: "Improved temperature characteristics of single-wall carbon nanotube single electron transistors using carboxymethylcellulose dispersant", Applied Physics Letters, AIP, American Institute of Physics, Melville, NY, US, vol. 91, No. 26, Dec. 27, 2007, pp. 263511-1-263511-3, XP012105011, ISSN: 0003-6951, DOI: DOI:10.1063/1.2828112.

International Search Report and Written Opinion for corresponding International Application No. PCT/IB2011/000051 mailed Jul. 1, 2011.

Communication dated Mar. 26, 2014, issued by the State Intellectual Property Office of the People's Republic of China in corresponding Application No. 201180006144.2.

Oetjen et al., "Freeze-Drying, Completely Revised and Extended Edition", Wiley-VCH, 2005, pp. 345-350, Chem. Industry Press.

* cited by examiner

F I G . 7
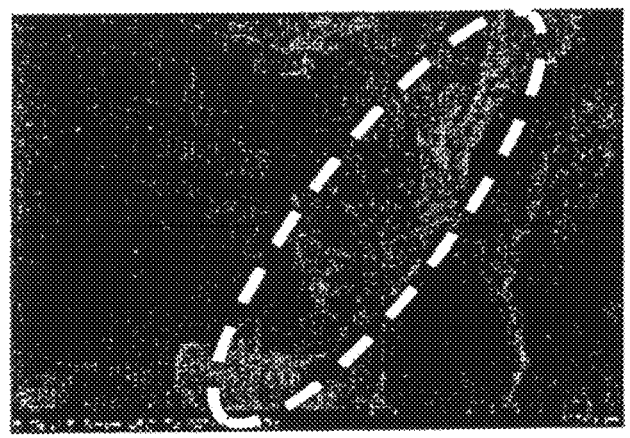
F I G . 8
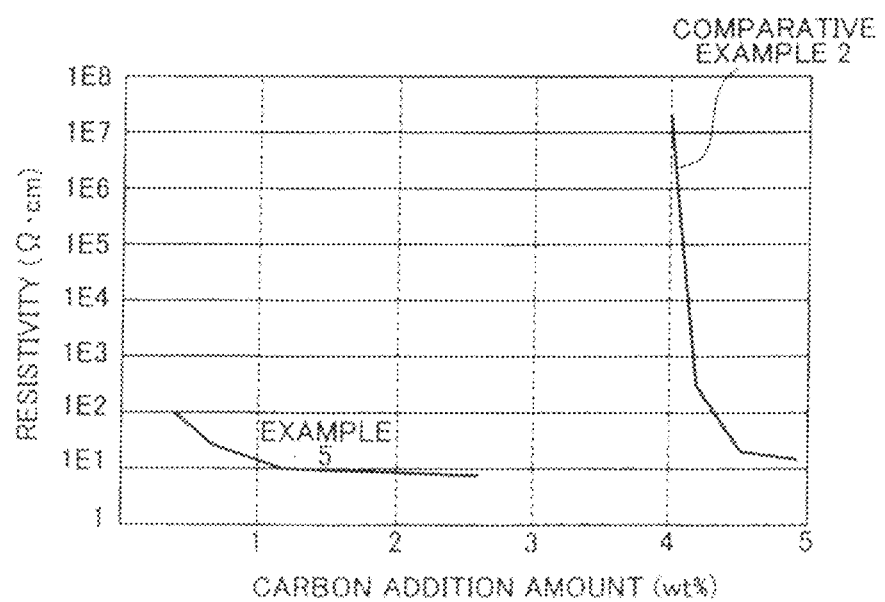

METHOD FOR MANUFACTURING COMPOSITE POSITIVE ELECTRODE ACTIVE MATERIAL

BACKGROUND OF THE INVENTION

1. Field of the Invention

The invention relates to a method for manufacturing a composite positive electrode active material that is useful, for instance, as a positive electrode active material in lithium secondary batteries. More particularly, the invention relates to a method for manufacturing a composite positive electrode active material that allows obtaining a composite positive electrode active material that has excellent output characteristics, by forming a composite in which aggregation of carbon nanotubes is suppressed and dispersibility between a positive electrode active material and carbon nanotubes is enhanced.

2. Description of the Related Art

Among various types of batteries, lithium secondary batteries are widely used as power sources in small portable electronic devices, portable information terminals and the like thanks to the advantages of lithium secondary batteries in terms of light weight, high output and high energy density. Lithium secondary batteries have become thus one mainstay of the information society. Lithium secondary batteries have also attracted attention as power sources in electric and hybrid vehicles, which demand larger and safer batteries having yet higher energy densities.

To store lithium in the positive electrode active material of positive electrodes of lithium secondary batteries, electrons must be transported to the positive electrode active material. The positive electrode active material, however, has low election conductivity, and hence a conductive substance such as carbon or the like is added to increase electron conductivity. Conventionally, the substance used as such a conductive substance has been mainly carbon black. There are hints that the composite structure of positive electrode active materials and conductive substances exert an influence on battery performance, namely high-rate charge and discharge characteristics. The use of conductive substances in the form of carbon nanotubes (CNT), which have a finer structure, is thus being explored.

For instance, Japanese Patent Application Publication No. 2008-34376 (JP-A-2008-34376) discloses a composite positive electrode material obtained by forcibly dispersing carbon nanotubes and a positive electrode active material in a solvent, followed by drying and solidification to yield a composition into which a conductive substance having a predetermined aspect ratio is then mixed. Also, Japanese Patent Application Publication No. 2008-130526 (JP-A-2008-130526) and Japanese Patent Application Publication No. 2005-123107 (JP-A-2005-123107) disclose methods for manufacturing a carbon-containing active material by mixing, for instance, a starting material of an active material having an olivine structure, with a carbon material and so forth, and by subjecting the obtained mixture to a heating treatment in a hydrothermal synthesis method.

In JP-A-2008-34376, the conductive substance having is predetermined aspect ratio is intercalated between composite particles of the positive electrode active material to which the carbon nanotubes are adhered, as a result of which there is presumably achieved a structure having sufficient conduction paths, and into which an electrolyte solution seeps smoothly, so that the structure exhibits excellent Li ion diffusion. However, carbon nanotubes have high self-aggregation, and aggregate as individual carbon nanotubes. Therefore it is not possible to obtain a positive electrode active material in which carbon nanotubes are homogeneously dispersed. Japanese Patent Application Publication No. 2009-81072 (JP-A-2009-81072) discloses a method for manufacturing an electrode body in which a positive electrode active material is produced in accordance with a hydrothermal synthesis method, and thereafter, a conductive agent or the like is added to the positive electrode active material, without drying, end the obtained paste is coated onto to collector. Aggregation of the positive electrode active material is suppressed as a result. However, JP-A-2009-81072 discloses nothing concerning aggregation of a conductive substance in a composite of a positive electrode active material and a conductive substance.

SUMMARY OF THE INVENTION

The invention provides a method for manufacturing a composite positive electrode active material that allows obtaining a composite positive electrode active material that has excellent output characteristics by forming a composite in which aggregation of carbon nanotubes is suppressed and dispersibility between a positive electrode active material and carbon nanotubes is enhanced.

An aspect of the invention relates to a method for manufacturing a composite positive electrode active material being a composite of a positive electrode active material and carbon nanotubes. The manufacturing method includes preparing an aqueous solution of a starting material of a positive electrode active material containing a starting material of the positive electrode active material, and an aqueous solution of solubilized carbon nanotubes containing the carbon nanotubes and a solubilizing material that is composed of a water-soluble polymer whose solubilization retention rate of carbon nanotubes does not decrease with rising temperature; and synthesizing a positive electrode active material-carbon nanotube composite by mixing the aqueous solution of a starting material of a positive electrode active material and the aqueous solution of solubilized carbon nanotubes, and performing hydrothermal synthesis.

The invention allows forming a composite in which aggregation of carbon nanotubes is suppressed, and dispersibility between a positive electrode active material and carbon nanotubes is enhanced, as a result of mixing an aqueous solution of a starting material of a positive electrode active material containing a starting material of the positive electrode active material, with as aqueous solution of solubilized carbon nanotubes containing carbon nanotubes and a solubilizing material that is composed of a water-soluble polymer whose solubilization retention rate of carbon nanotubes does not decrease with rising temperature, and performing hydrothermal synthesis. As a result there can be obtained a composite positive electrode active material having enhanced electron conductivity and excellent output characteristics.

The solubilizing material may be a polymer having a ring structure composed of carbon (C), or carbon (C) and oxygen (O), since such a polymer acts readily on carbon nanotubes.

The ring structure may be a tetrahydrofuran ring or a tetrahydropyran ring, and the water-soluble polymer may be a saccharide.

The saccharide may be a water-soluble xylan or carboxymethyl cellulose (CMC).

The ring structure may be an aromatic ring, and the water-soluble polymer may be sodium polystyrene sultanate (PSS).

The positive electrode active material may have an olivine structure. Positive electrode active materials having an olivine structure have low electron conductivity, and allow bringing out the effect of the invention in a particularly significant manner.

The manufacturing method according to this aspect of the invention may include removing water in the positive electrode active material-carbon nanotube composite while maintaining a dispersion state of the carbon nanotubes contained in the synthesized positive electrode active material-carbon nanotube composite, since doing so allows suppressing re-aggregation of carbon nanotubes after hydrothermal synthesis, and allows obtaining a composite positive electrode active material having high dispersibility between the positive electrode active material and the carbon nanotubes.

Water in the positive electrode active material-carbon nanotube composite may be removed by freeze-drying. That is because a composite positive electrode active material having high dispersibility between a positive electrode active material and carbon nanotubes, and in which re-aggregation of carbon nanotubes is suppressed, can be obtained accordance with a highly versatile method and in a simple manner by performing hydrothermal synthesis and, thereafter, freezing water as a solvent, followed by pressure reduction, sublimation and drying.

The invention allows obtaining a composite positive electrode active material that has excellent output characteristics by forming a composite in which aggregation of carbon nanotubes is suppressed and dispersibility between a positive electrode active material and carbon nanotubes is enhanced.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 7 is a SEM micrograph of a composite positive electrode active material obtained in Comparative example 1; and FIG. 8 is a graph illustrating results of a measurement of powder compact resistance in composite positive electrode active materials obtained in Example 5 and Comparative example 2.

DETAILED DESCRIPTION OF EMBODIMENTS

The embodiment of the invention fit a method for manufacturing a composite positive electrode active material being a composite of a positive electrode active material and carbon nanotubes. The manufacturing method includes a preparation step of preparing an aqueous solution of a starting material of a positive electrode active material containing a starting material of the positive electrode active material, and an aqueous solution of solubilized carbon nanotubes containing carbon nanotubes and a solubilizing material that is composed of a water-soluble polymer whose solubilization retention rate of the carbon nanotubes does not decease with rising temperature; and a hydrothermal synthesis step of synthesizing a positive electrode active material-carbon nanotube composite by mixing the aqueous solution of a starting material of a positive electrode active material and the aqueous solution of solubilzed carbon nanotubes, and performing hydrothermal synthesis.

Carbon nanotubes have strong self-aggregation, and hence it is difficult to form a homogeneous composite of carbon nanotubes and a positive electrode active material, on account of, for instance, ball milling and shear stress in subsequent processes after the synthesis of the positive electrode active material. Moreover, aggregation of only the carbon nanotubes results in a non-homogeneous composite positive electrode active material having low dispensability between the positive electrode active material and the carbon nanotubes, when performing hydrothermal synthesis of a mixture of a positive electrode active material and carbon nanotubes. In the present embodiment, by contrast, there is used a solubilizing material composed of a water-soluble polymer whose solubilization retention rate of carbon nanotubes does not decrease with rising temperature, as a result of which the carbon nanotubes can be highly dispersed, even at high temperatures, such as those found in hydrothermal synthesis. This allows enhancing the dispersibility between the positive electrode active material and the carbon nanotubes, and achieving a more homogeneous composite. Electron conductivity is enhanced as a result, and there can be obtained a composite positive electrode active material having excellent output characteristics.

Aggregation of carbon nanotubes is ordinarily classified into physical aggregation, derived from van der Waals forces, and chemical aggregation, derived from chemical bonds between particles. The aggregation mechanism varies depending on the type and the manufacturing history of the carbon nanotubes. In the present embodiment it is mainly the physical aggregation of carbon nanotubes that is believed to be suppressed through the use of a solubilizing material composed of a water-soluble polymer whose solubilization retention rate of carbon nanotubes does not decrease with rising temperature.

Figure 1:
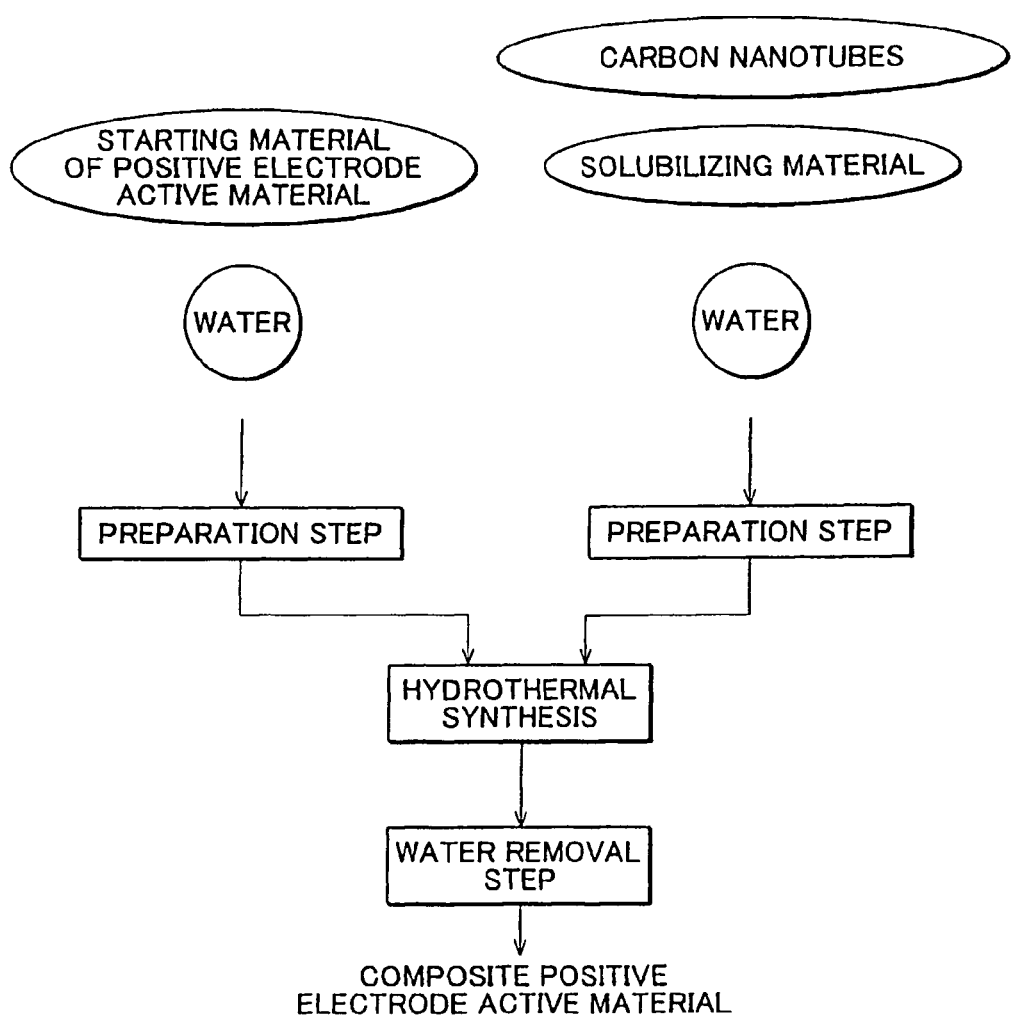
FIG. 1 is a flowchart illustrating an example of a manufacturing a composite positive electrode active material according to an embodiment of the invention.

FIG. 1 is a flowchart illustrating an example of the method for manufacturing a composite positive electrode active material of the present embodiment. In the method for manufacturing a composite positive electrode active material illustrated in FIG. 1, there are firstly prepared an aqueous solution of a starting material of a positive electrode active material containing a starting material of a positive electrode active material; and an aqueous solution of solubilized carbon nanotubes that contains carbon nanotubes and a solubilizing material composed of a water-soluble polymer whose solubilization retention rate of carbon nanotubes does not decrease with rising temperature (preparation step). Next, the above aqueous solutions are poured into an autoclave, at a predetermined proportion; and are held, for instance, at hydrothermal conditions of 190° C. for 12 hours, under stirring, to synthesize thereby a positive electrode active material-carbon nanotube composite (hydrothermal synthesis step). The aqueous solution of a positive electrode active material-carbon nanotube composite is cooled to ordinary temperature, and water in the positive electrode active material-carbon nanotube composite is removed, for instance, by freeze-drying (water removal step), to yield a composite positive electrode active material. Each step of the method for manufacturing a composite positive electrode active material of the present embodiment is explained below.

1. Preparation Step

The preparation step of the present embodiment will be explained first. In the preparation step of the present embodiment there are prepared an aqueous solution of a starting material of a positive electrode active material that contains a starting material of a positive electrode active material, and an aqueous solution of solubilized carbon nanotubes that contains carbon nanotubes and a solubilizing material composed of a water-soluble polymer whose solubilization retention rate of carbon nanotubes does not decrease with rising temperature.

(1) Carbon Nanotubes Solubilization Aqueous Solution

The aqueous solution of solubilized carbon nanotubes of the present embodiment contains carbon nanotubes and a solubilizing material composed of a water-soluble polymer whose solubilization retention rate of carbon nanotubes does not decrease with rising temperature.

(a) Solubilizing Material

The solubilizing material of the present embodiment is a water-soluble polymer whose solubilization retention rate of carbon nanotubes does not decrease with rising temperature. Using such a water-soluble polymer as a solubilizing material allows maintaining a dispersion of a positive electrode active material and carbon nanotubes also under high-temperature hydrothermal synthesis conditions. As used herein, the term "solubilization retention rate of carbon nanotubes" is defined as "(absorbance of an aqueous solution of solubilized carbon nanotubes at an arbitrary temperature/absorbance of ordinary-temperature aqueous solution of solubilized carbon nanotubes)*100(%)". In the present embodiment, the aqueous solution of solubilized carbon nanotubes at an arbitrary temperature refers to an aqueous solution of solubilized carbon nanotubes obtained by rising from ordinary temperature, to an arbitrary temperature, the temperature of an aqueous solution of solubilized carbon nanotubes. The ordinary-temperature aqueous solution of solubilized carbon nanotubes is prepared in the form of a ordinary-temperature supernatant solution obtained by mixing a solubilizing material, carbon nanotubes and water as a solvent, and dispersing then the carbon nanotubes using ultrasounds or the like, followed by centrifugation. Herein, absorbance is obtained by UV-visible absorbance measurement (UV measurement). For instance, a UV-VIS spectrophotometer UV-3600, by Shimadzu, can be used as the measurement instrument. Also, the feature "whose solubilization retention rate of carbon nanotubes does not decrease with rising temperature" means that the solubilization retention rate of carbon nanotubes is not lower than 95% at 90° C., and not lower than 80% at 190° C.

The mechanism whereby the solubilizing material maintains the solubilization of carbon nanotubes at high temperature is believed to involve intrusion of the solubilizing material into loose gaps between aggregated carbon nanotube fibers, which has the effect of preventing contact between carbon nanotubes, thereby hindering the aggregation of carbon nanotubes. The solubilizing material in the present embodiment is a water-soluble polymer having a long molecular chain with numerous points at which carbon nanotubes can become tangled. Carbon nanotubes are expected to be prevented more readily thereby from coming into contact with each other, so that aggregation of carbon nanotubes is prevented as a result.

The solubilizing materiel of the present embodiment has hydrophilic sites for making the material water-soluble, and hydrophobic sites for acting on hydrophobic carbon nanotubes. The aforementioned hydrophobic sites are not particularly limited and may take the form of, for instance, a ring structure composed of carbon (C), for instance an aromatic ring, a cycloalkane ring, a cycloalkene ring or the file; a ring structure composed of carbon (C) and oxygen (O), such as a pyran ring or a furan ring; or an alkyl group such as a methyl group or an ethyl group. In the present embodiment, preferably, the solubilizing material is a polymer having a ring structure composed of carbon (C), or carbon (C) and oxygen (O), since such ring structures exhibit readily affinity with carbon nanotubes and act readily on the latter.

In the present embodiment, preferably, the ring structure is a tetrahydrofuran ring or a tetrahydropyran ring and the water-soluble polymer is a saccharide, since such a polymer exhibits increased solubility in water with rising temperature, and exhibits a high carbon nanotube, solubilization retention-rate even at high temperature. The saccharide is not particularly limited, and may be, for instance, a water-soluble xylan, carboxymethyl cellulose (CMC), a pectin, polygalacturonic acid or the like, preferably a water-soluble xylan or carboxymethyl cellulose (CMC). In the present embodiment, the ring structure is preferably an aromatic ring. Such a water-soluble polymer is not particularly limited, but is preferably sodium polystyrene sulfonate (PSS), since the latter exhibits increased solubility in water with rising temperature, and the solubilization retention rate of carbon nanotubes does not decrease even at high temperature.

The water-soluble polymer whose solubilisation retention rate of carbon nanotubes does not decrease with rising temperature of the present embodiment is ordinarily a water-soluble polymer having increased solubility in water with rising temperature. Maintaining the solubilization of carbon nanotubes at high temperature is difficult in the case of water-soluble polymers having decreasing solubility in water with rising temperature, or in case of polymers having a cloud point.

Preferably, the concentration of the solubilizing material contained in the aqueous solution of solubilized carbon nanotubes of the present embodiment is appropriately selected in accordance with the concentration of carbon nanotubes contained in the aqueous solution of solubilized carbon nanotubes and in accordance with the solubility of the solubilizing material that is used.

(b) Carbon Nanotubes

The carbon nanotubes of the present embodiment are not particularly limited, and there may be used single-wall carbon nanotubes (SWNT), or multi-wall carbon nanotubes (MWNT) such as double-wall carbon nanotubes (DWNT). The carbon nanotubes can be obtained by, for instance, arc discharge, laser vaporization, chemical vapor deposition (CVD), hydrocarbon catalytic decomposition or the like. Ordinarily, tangles of carbon nanotubes are hard to unravel easily when the carbon nanotubes have a large aspect ratio, and hence such carbon nanotubes having a large aspect ratio exhibit therefore poor dispersibility. The aspect ratio of the carbon nanotubes of the present embodiment is not particularly limited, but ranges, for instance, from 100 to 50,000, preferably from 100 to 5,000.

Preferably, the concentration of the carbon nanotubes contained in the aqueous solution of solubilized carbon nanotubes of the present embodiment is appropriately selected in accordance with the composition of the target composite positive electrode active material.

(c) Others

The aqueous solution of solubilized carbon nanotubes of the present embodiment contains water as a solvent. The water used in the aqueous solution of solubilzed carbon nanotubes is not particularly limited, so long as it does not impair the solubilizing material or the carbon nanotubes, and may be, for instance, pure water, distilled water or the like. The aqueous solution of solubilized carbon nanotubes may contain, as the case may require, additives such as alcohols, N-methyl-2-pyrrolidone (NMP), N,N-dimethylformamide (DMF) or the like. The method for preparing the aqueous solution of solubilized carbon nanotubes of the present embodiment may involve, for instance, mixing carbon nanotubes, the solubilizing material and distilled water, and dispersing the carbon nanotubes through irradiation of ultrasounds, followed by centrifugation, to obtain a supernatant that is the aqueous solution of solubilized carbon nanotubes.

(2) Aqueous Solution of a Starting Material of a Positive Electrode Active Material The aqueous solution of a starting material of a positive electrode active material of the present embodiment contains a starting material of a positive electrode active material. The starting material of a positive electrode active material is not particularly limited, so long as it allows obtaining, by way of the below-described hydrothermal synthesis step, a composite positive electrode active material resulting from forming a composite of the positive electrode active material and carbon nanotubes. For instance, the starting material of a positive electrode active material may be a starting material of an olivine-type positive electrode active material or a starting material of an oxide positive electrode active material.

The starting material of an olivine-type positive electrode active material contains ordinarily a Li source, a transition metal source, and a P source. Examples of the Li source include, for instance, LiOH and hydrates thereof. The transition metal source varies depending on the chemical composition of the target olivine-type positive electrode active material, but may be, for instance, a sulfate or a chloride of, for instance, Fe, Mn, Ni or Ca. Such sulfates and chlorides may be in the form of hydrates. Examples of P sources include, for instance, $H_3PO_4$ and $NH_4H_2PO_4$. The Li source and the P source may be one same compound, specifically, for instance, $Li_3PO_4$ or the like.

The starting material of an oxide positive electrode active material contains ordinarily a Li source and a transition metal source. Examples of the Li source include, for instance, LiOH and hydrates thereof. The transition metal source varies depending on the chemical composition of the target oxide positive electrode active material, and may be, for instance, an oxide or a carbonate of a transition metal such as Co, Mn or Ni.

Among the foregoing, the starting material of a positive, electrode active material used in the present embodiment is preferably a starting material of an olivine-type positive electrode active material, since a positive electrode active material having an olivine structure has low electron conductivity, and yields therefore a composite positive electrode active material having high dispersibility with carbon nanotubes, as a result of which electron conductivity can be particularly enhanced. It is considered that the effect of the invention is brought out not only for an olivine-type positive electrode active material, but also in other positive electrode active materials having low electron conductivity.

Preferably, the above-described starting material of a positive electrode active material is dissolved or is highly dispersed in the aqueous solution of a starting material of a positive electrode active material of the present embodiment, since in this case there can be achieved a moo homogeneous composite with carbon nanotubes in a below-described hydrothermal synthesis step. Herein, the feature "highly dispersed" means that particles of the starting material of a positive electrode active material do not aggregate in aqueous solution.

The aqueous solution of a starting material of a positive electrode active material of the present embodiment contains water as a solvent. The water used in the aqueous solution of a starting material of a positive electrode active material is not particularly limited, provided that the water does not impair the starting material of a positive electrode active material, and may be, for instance, pure water, distilled water or the like. The aqueous solution of a starting material of a positive electrode active material may also contain, as the case may require, additives such as surfactants and carbon nanotube solubilizing materials. Preferably, the concentration of the starting material of a positive electrode active material contained in the aqueous solution of a starting material of a positive electrode active material of the present embodiment is selected appropriately in accordance with the chemical composition of the target positive electrode active material. The method for preparing the aqueous solution of a starting material of a positive electrode active material is not particularly limited, so long as the starting material of a positive electrode active material can be dissolved or be highly dispersed in water as a solvent.

2. Hydrothermal Synthesis Step

The hydrothermal synthesis step of the present embodiment is explained next. The hydrothermal synthesis step of the present embodiment is a step of synthesizing a positive electrode active material-carbon nanotube composite by mixing the aqueous solution of a starting material of a positive electrode active material and the aqueous solution of solubilized carbon nanotubes, and performing hydrothermal synthesis.

Preferably, the mixing ratio between the aqueous solution of a starting material of a positive electrode active material and the aqueous solution of solubilized carbon nanotubes is appropriately selected in the present step in accordance with the composition of the target positive electrode active material-carbon nanotube composite.

The synthesis temperature in the present embodiment is not particularly limited so long as the target positive electrode active material-carbon nanotube composite can be obtained, and ranges, for instance, from 100° C. to 300° C., preferably from 150° C. to 250° C. The synthesis time the present embodiment ranges, for instance, from 0.5 hours to 24 hours, preferably from 1 hour to 12 hours. The synthesis pressure in the present embodiment ranges for instance from 1,022 hPa to 94,112 hPa, preferably from 4,906 hPa to 43,030 hPa.

The hydrothermal synthesis step of the present embodiment is carried out, for instance, in a reaction vessel that can withstand high temperature and high pressure, such as an autoclave. Preferably, air, nitrogen or the like within the autoclave is replaced by an inert gas, since doing so allows preventing deterioration of the positive electrode active material-carbon nanotube composite.

3. Other Steps

In addition to the above-described preparation step and hydrothermal synthesis step, as essential steps, the present embodiment includes preferably also a water removal step of removing water in the positive electrode active material-carbon nanotube composite while maintaining a dispersion state of the carbon nanotubes contained in the positive electrode active material-carbon nanotube composite after the hydrothermal synthesis. That is because doing so allows suppressing re-aggregation of carbon nanotubes after hydrothermal synthesis, and allows obtaining a composite positive electrode active material having high dispersibility between the positive electrode active material and the carbon nanotubes.

The method for maintaining the dispersion state of carbon nanotubes contained in the positive electrode active material-carbon nanotube composite after hydrothermal synthesis may be, for instance, a method of maintaining the dispersion state by nullifying the fluidity of water as the solvent, or a method of maintaining the dispersion state by nullifying the fluidity of the positive electrode active material-carbon nanotube composite itself. However, a preferred method involves maintaining the dispersion state by nullifying the fluidity of water as the solvent. A specific example of such a method may involve, for instance, freezing water or fixing water with gelatin or the like. The method for removing water from the positive electrode active material-carbon nanotube composite in the present embodiment is not particularly limited, so long as the target composite positive electrode active material can be obtained.

In the present embodiment, preferably, the water removal step involves freeze-drying. That is because a composite positive electrode active material having high dispersibility between a positive electrode active material and carbon nanotubes, and in which re-aggregation of carbon nanotubes is suppressed, can be obtained in accordance with a highly versatile method and in a simple manner by performing hydrothermal synthesis and, thereafter, freezing water as a solvent, followed by pressure reduction, sublimation and drying.

The freezing temperature in the present embodiment is not particularly limited so long as the temperature allows freezing water without impairing the positive electrode active material-carbon nanotube composite. For instance, the freezing temperature is not higher than 0° C., preferably not higher than −10° C. Preferably, the water freezing method involves immersion in liquid nitrogen, since in that case water can be frozen instantaneously, and deterioration of the positive electrode active material-carbon nanotube composite can be prevented. Preferably, the atmosphere during sublimation and drying in the present embodiment is vacuum, since in this case impurities can be prevented from being mixed into the composite positive electrode active material.

The present embodiment may further include a firing step of firing the obtained positive electrode active material-carbon nanotube composite after the above-described water removal step. A highly crystalline composite positive electrode active material having few impurities can be obtained through firing of the positive electrode active material-carbon nanotube composite.

The firing temperature in the present embodiment is not particularly limited, so long as the target composite positive electrode active material can be obtained, and ranges, for instance, from 200° C. to 1,000° C., and preferably from 300° C. to 800° C., since impurities may remain in significant amounts if the firing temperature is too low, while the target composite positive electrode active material may fail to be obtained if the firing temperature is too high. The firing time in the present embodiment ranges for instance from 5 minutes to 10 hours, preferably from 1 hour to 3 hours.

The atmosphere during firing in the present embodiment is not particularly limited so long as it does not impair the composite positive electrode active material. For instance, the atmosphere may be an air atmosphere, an inert gas atmosphere such as a nitrogen atmosphere or an argon atmosphere; a reducing atmosphere such as an ammonia atmosphere, a hydrogen atmosphere or a carbon monoxide atmosphere; or vacuum. Preferred among the foregoing is an inert gas atmosphere, a reducing atmosphere or vacuum, in particular a reducing atmosphere, since a reducing atmosphere allows preventing oxidative deterioration of the composite positive electrode active material. The fixing method of the composite positive electrode active material may be, for instance, a method wherein a firing furnace is used.

4. Composite Positive Electrode Active Material

The composite positive electrode active material obtained in accordance with the present embodiment results from forming a composite of a positive electrode active material and carbon nanotubes. Through the above-described processes, the present embodiment allows forming a composite in which aggregation of carbon nanotubes is suppressed and dispersibility between a positive electrode active material and carbon nanotubes is enhanced, during hydrothermal synthesis. During recovery as well, the embodiment allows suppressing re-aggregation of carbon nanotubes after hydrothermal synthesis, and allows obtaining a final composite positive electrode active material having high dispersibility between a positive electrode active material and carbon nanotubes. The dispersibility between the positive electrode active material and carbon nanotubes in the composite positive electrode active material can be observed, for instance, on SEM micrographs. Examples of the composite positive electrode active material obtained in accordance with the present embodiment include, for instance, a composite positive electrode active material obtained by forming a composite of an olivine-type positive electrode active material with carbon nanotubes, and a composite positive electrode active material obtained by forming a composite of an oxide positive electrode active material with carbon menthes. Preferred among the foregoing is a composite positive electrode active material obtained by forming a composite of an olivine-type positive electrode active material with carbon nanotubes, since positive electrode active materials having an olivine structure have low electron conductivity, and allow bringing out the effect of the present embodiment in a particularly significant manner. Examples of olivine-type positive electrode active materials include, for instance, $LiFePO_4$ and $LiMnPO_4$.

Preferably, the ratio between the positive electrode active material and carbon nanotubes in the composite positive electrode active material obtained in accordance with the present embodiment is appropriately selected is accordance with the target composite positive electrode active material, but, for instance, ranges preferably from positive electrode active material:carbon nanotubes=95 to 99.7:0.3 to 5, on a weight ratio basis. That is because sufficient electron conductivity may fail to be achieved if the content of positive electrode active material in the composite positive electrode active material is excessive, on account of too small a content of carbon nanotubes, while, by contrast, sufficient battery capacity may fail to be achieved if the content of positive electrode active material in the composite positive electrode active material is too small.

The ratio between the positive electrode active material and carbon nanotubes is determined by the mixing ratio between the aqueous solution of a starting material of a positive electrode active material and the aqueous solution of solubilized carbon nanotubes in the hydrothermal synthesis step.

Preferably, the average particle size of the composite positive electrode active material obtained in accordance with the present embodiment ranges for instance from 0.05 μm to 0.5 μm. A value calculated using a laser diffraction particle size analyzer, or value measured cm the basis of imago analysis using micrographs obtained by SEM microscopy or the like, can be taken herein as the avenge particle size.

The composite positive electrode active material obtained in accordance with the present embodiment is useful, for instance, as a positive electrode active material for lithium secondary batteries. A positive electrode layer can be formed, for instance, through press-molding of a powder of the composite positive electrode active materiel. The present embodiment allows providing also a method for manufacturing an electrode body using a composite positive electrode active material obtained in accordance with the above-described method for manufacturing a composite positive electrode active material.

The present embodiment is not limited to the embodiment above, which is merely illustrative.

EXAMPLES

The invention is explained more specifically below on the basis of examples.

Preparative Example 1

Preparation of an Aqueous Solution of Solubilized Carbon Nanotubes

Herein, 5 mg of single-wall carbon nanotubes (SWNT), 50 mg of carboxymethyl cellulose (CMC) and 10 g of distilled water were mixed and were irradiated with ultrasounds for 60 minutes, to disperse the carbon nanotubes. This was followed by centrifugation at about 4000 G for 1 hour, to yield a supernatant as an aqueous solution of solubilized carbon nanotubes.

Preparative Example 2

An aqueous solution of solubilized carbon nanotubes was obtained in the same way as in Preparative example 1, but herein sodium polystyrene sulfonate (PSS) was used instead of carboxymethyl cellulose (CMC).

Preparative Example 3

An aqueous solution of solubilized carbon nanotubes was obtained in the same way as in Preparative example 1, but herein a water-soluble xylan was used instead of carboxymethyl cellulose (mg, so that the mixture included 20 mg of the water-soluble xylan.

Preparative Example 4

An aqueous solution of solubilized carbon nanotubes was obtained in the same way as in Preparative example 1, but herein cetyl trimethyl ammonium bromide (CTAB) was used instead of carboxymethyl cellulose (CNC), so that the mixture included 10 mg of CTAB.

Preparative Example 5

An aqueous solution of solubilized carbon nanotubes was obtained in the same way as in Preparative example 1, but herein sodium cholate was used instead of carboxymethyl cellulose (CMC), so that the mixture included 10 mg of sodium cholate.

Preparative Example 6

An aqueous solution of solubilized carbon nanotubes was obtained in the same way as in Preparative example 1, but herein Triton X was used instead of carboxymethyl cellulose (CMC), so that the mixture included 40 mg of Triton X.

Evaluation 1

Evaluation of the Solubilizing Material

Figure 2:
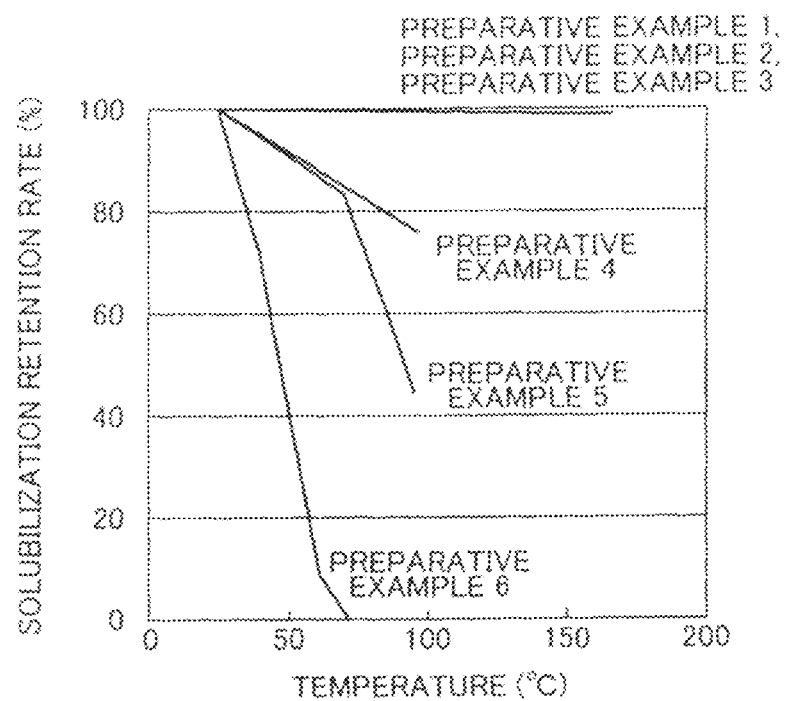
FIG. 2 is a graph illustrating the temperature dependence of the solubilization retention rate of carbon nanotubes in an aqueous solution of solubilized carbon nanotubes obtained in Preparative examples 1 to 6.

A UV-visible absorbance measurement (UV measurement) was performed on the aqueous solutions of solubilized carbon nanotubes obtained in Preparative examples 1 to 6, and there was evaluated the dependence on temperature of the solubilization retention rate of the carbon nanotubes, in a range extending from ordinary temperature to at least about 100° C. The UV measurement was performed using an UV-3600 instrument by Shimadzu. Aqueous solutions of solubilized carbon nanotubes at various temperatures were obtained by heating an ordinary-temperature aqueous solution of solubilized carbon nanotubes using a hot plate. The solubilization retention rates at the various temperatures were calculated in the form of (absorbance of aqueous solution of solubilized carbon nanotubes at a respective temperature/absorbance of ordinary-temperature aqueous solution of solubilzed carbon nanotubes)*100(%). The obtained results are illustrated in FIG. 2. Table 1 sets out the above results as well as a summary of the characteristics of the solubilizing materials used in Preparative examples 1 to 6.

TABLE 1

| | Solubilizing material | CNT amount (mg) | Solubilizing material amount (mg) | Pure water amount (g) | Solubilizing material type | Solubility of solubilizing material vs. temperature | Solubilization retention rate at 100° C. or above |
| --- | --- | --- | --- | --- | --- | --- | --- |
| Preparative example 1 | CMC | 5 | 50 | 10 | Polymer | Increasing | Good |
| Preparative example 2 | PSS | 5 | 50 | 10 | Polymer | Increasing | Good |
| Preparative example 3 | Water-soluble xylan | 5 | 20 | 10 | Polymer | Increasing | Good |
| Preparative example 4 | CTAB | 5 | 10 | 10 | Monomer | Increasing | Poor |
| Preparative example 5 | Sodium cholate | 5 | 10 | 10 | Monomer | Increasing | Poor |
| Preparative example 6 | Triton X | 5 | 40 | 10 | Polymer | Decreasing | Poor |

As FIG. 2 shows, the solubilizing material, used in Preparative examples 1 to 3 exhibited no decrease in solubilization retention rate even with rising temperature. By contrast, the solubilization retention rate of the solubilizing materials used in Preparative examples 4 to 6 decreased with rising temperature. In particular, the solubilization retention rate for Triton X in Preparative example 6 decreased noticeably, to 0%, at or below 100° C.

As Table 1 shows, the solubilizing materials used in Preparative examples 1 to 3 were water-soluble polymers having increased solubility in water with rising temperature, and all were capable of maintaining carbon nanotube solubilization at 100° C. and above. By contrast, the solubilizing materials used in Preparative examples 4 and 5, which were water-soluble monomers having increasing solubility in water with rising temperature, and the solubilizing material used in Preparative example 6, which was a water-soluble polymer having decreasing solubility in water with rising temperature, failed all to maintain carbon nanotube solubilization at 100° C. and above. The above resells suggest that, under high-temperature hydrothermal conditions at 100V or above, solubilization of carbon nanotubes can be maintained by using a solubilizing material in the form of a water-soluble polymer having increasing solubility in water with rising temperature.

Example 1

Firstly, lithium phosphate (URN and iron (II) sulfate heptahydrate ($FeSO_4 \cdot 7H_2O$) were mixed with 170 ml of pure water deaerated through nitrogen bubbling, to a concentration of 1 mol/l each, to prepare an aqueous solution of a Starting material of a positive electrode active material. Then 170 ml of the aqueous solution of a starting material of a positive electrode active material and 50 ml of the aqueous solution of solubilized carbon nanotubes obtained in Preparative example 1 were poured into an autoclave having an inner capacity of 500 ml. The whole was kept for 12 hours, under stirring, at a hydrothermal condition of 190° C., to synthesize a positive electrode active material-carbon nanotube composite. The suspension of the positive electrode active material-carbon nanotube composite was cooled to ordinary temperature, and was frozen thereafter through immersion in liquid nitrogen. The frozen product was transferred to a glass container, and was vacuum-dried at ordinary temperature, to yield a composite positive electrode active material resulting from forming a composite of a positive electrode active material and carbon nanotubes.

Example 2

A composite positive electrode active material was obtained in the same way as in Example 1, but using herein the aqueous solution of solubilized carbon nanotubes obtained in Preparative example 2.

Example 3

A composite positive electrode active material was obtained in the same way as in Example 1, but using herein the aqueous solution of solubilized carbon nanotubes obtained in Preparative example 3.

Example 4

A composite positive electrode active material, was obtained in the same way as in Example 3, but herein the suspension of positive electrode active materiel-carbon nanotube composite was cooled to ordinary temperature, was transferred thereafter to a glass container, and was vacuum dried at ordinary temperature.

Comparative Example 1

A composite positive electrode active material was obtained in the same way as in Example 4, but using herein the aqueous solution of solubilized car bon nanotubes obtained in Preparative example 6.

Evaluation 2

Evaluation of Carbon Nanotube Dispersibility

The dispersibility of carbon nanotubes in the composite positive electrode active materials obtained in Examples 1 to 4 and Comparative example 1 was observed by SEM. FIGS. 3 to 7 illustrate SEM micrographs of these composite positive electrode active materials.

Figure 3:
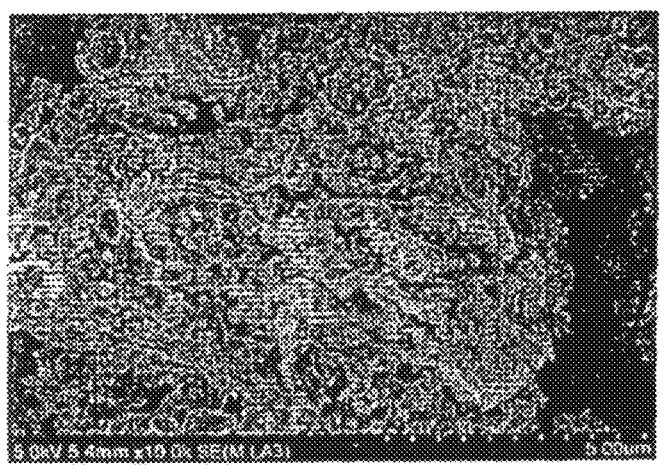
FIG. 3 is a SEM micrograph of a composite positive electrode active material obtained in Example 1.
Figure 4:
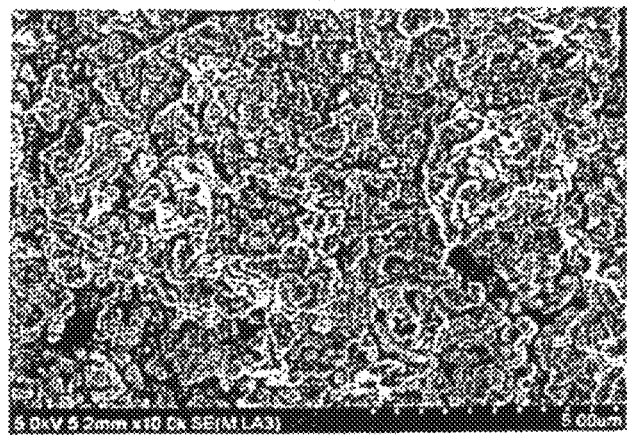
FIG. 4 is a SEM micrograph of a composite positive electrode active material obtained in Example 2.
Figure 5:
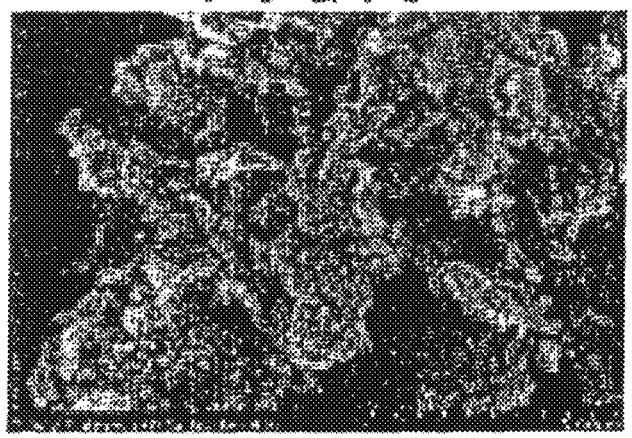
FIG. 5 is a SEM micrograph of a composite positive electrode active material obtained in Example 3.
Figure 6:
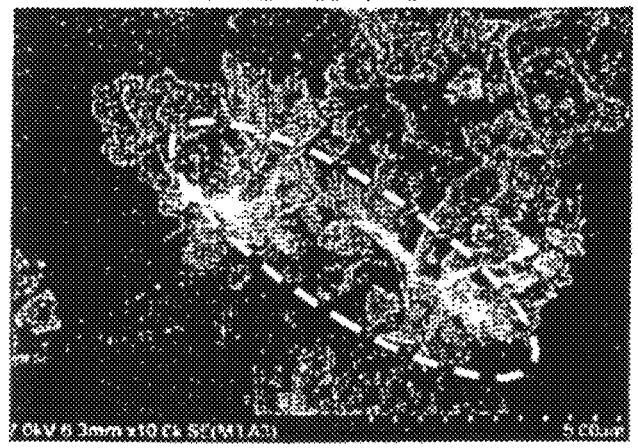
FIG. 6 is a SEM micrograph of a composite positive electrode active material obtained in Example 4.

As illustrated in FIG. 7, the SEM micrograph of the composite positive electrode active material obtained in Comparative example 1 revealed significantly aggregated carbon nanotubes at the portion enclosed by the dashed line. Dispensability was accordingly poor. As illustrated in FIG. 6, the SEM micrograph of the composite positive electrode active material obtained in Example 4 revealed partially aggregated carbon nanotubes, but dispersibility was found to be greater than in Comparative example 1. As illustrated in FIG. 5, the SEM micrograph of the composite positive electrode active material obtained in Example 3 revealed no carbon nanotube aggregation. This was indicative of enhanced dispersibility vis-à-vis Example 4. As FIGS. 3 and 4 show, the SEM micrographs of the composite positive electrode active materials obtained in Examples 1 and 2 revealed no carbon nanotube aggregation, as in the case of Example 3. Dispersibility was thus found to be high.

The above results indicate that dispersibility of carbon nanotubes in the composite positive electrode active material is enhanced by using a solubilizing material composed of a water-soluble polymer whose solubilization retention rate of carbon nanotubes does not decrease with rising temperature, and that dispersibility is further enhanced by including a recovery step by freeze-drying.

Evaluation 3

Compact Resistance Evaluation

A powder compact resistance evaluation was performed on the composite positive electrode active materials, obtained in Examples 1 to 3 and Comparative example 1, Compact resistance measured using 750 mg of each composite positive electrode active material, employing a powder resistance measurement system by Mitsubishi Chemical Analytech. The obtained results are given in Table 2.

TABLE 2

| | Solubilizing material | Dispersion state (SEM) | Compact resistance $\Omega \cdot cm$ |
|---|---|---|---|
| Example 1 | CMC | Good | $1 \times 10^4$ |
| Example 2 | PSS | Good | $2 \times 10^3$ |
| Example 3 | Water-soluble xylan | Good | $6 \times 10^2$ |
| Comparative example 1 | Triton X | Poor | $2 \times 10^7$ |

As Table 2 shows, the composite positive electrode active materials obtained in Examples 1 to 3 exhibited lower powder compact resistance values than that of the composite positive electrode active material obtained in Comparative example 1. This can be ascribed to the higher dispersibility of carbon nanotubes in the composite positive electrode active materials of Examples 1 to 3 than that of Comparative example 1.

Example 5

Composite positive electrode active materials were obtained in the same way as in Example 3, but changing the amount of aqueous solution of solubilized carbon nanotubes to 15 ml, 25 ml, 50 ml and 100 ml.

Preparative Example 7

Herein, 5 mg of acetylene black and 10 g of distilled water were mixed and were irradiated with ultrasounds for 60 minutes, to disperse the acetylene black. This was followed by centrifugation at about 4000 G for 1 hour, to yield a supernatant as a aqueous solution of solubilized acetylene black.

Comparative Example 2

Composite positive electrode active materials were obtained, through formation of a composite of acetylene black and a positive electrode active material, in the same way as in Example 4, but herein the aqueous solution of solubilized acetylene black obtained in Preparative example 7 was used instead of aqueous solution of solubilized carbon nanotubes obtained in Preparative example 3, and synthesis was carried out using 100 ml, 105 ml, 113 ml and 125 ml of the aqueous solution of solubilized acetylene black.

Evaluation 4

Compact Resistance Evaluation

A powder compact resistance evaluation was performed on the composite positive electrode active materials obtained in Example 5 and Comparative example 2, in accordance with the method described above. The obtained results are illustrated in FIG. 8.

As FIG. 8 shows, the composite positive electrode active material obtained in Example 5 was found capable of maintaining a significantly low powder compact resistance value, as compared with the composite positive electrode active material obtained in Comparative example 2, even with a small addition amount of carbon in the composite positive electrode active material. This result can be ascribed to the better carbon network formation ability of carbon nanotubes, even in small amounts, as compared with acetylene black.

The invention claimed is:

1. A method for manufacturing a composite positive electrode active material being a composite of a positive electrode active material and carbon nanotubes, comprising:
    preparing an aqueous solution of a starting material of a positive electrode active material containing a starting material of the positive electrode active material, and an aqueous solution of solubilized carbon nanotubes containing the carbon nanotubes and a solubilizing material that is composed of a water-soluble polymer having a ring structure composed of carbon (C), or carbon (C) and oxygen (O), whose solubilization retention rate of carbon nanotubes does not decrease with rising temperature;
    synthesizing a positive electrode active material-carbon nanotube composite by mixing the aqueous solution of a starting material of a positive electrode active material and the aqueous solution of solubilized carbon nanotubes, and performing hydrothermal synthesis; and
    removing water in the positive electrode active material-carbon nanotube composite while maintaining a dispersion state of the carbon nanotubes contained in the synthesized positive electrode active material-carbon nanotube composite,
    wherein water in the positive electrode active material-carbon nanotube composite is removed by freeze-drying.

2. The manufacturing method according to claim 1, wherein
    the ring structure is a tetrahydrofuran ring or a tetrahydropyran ring, and the water-soluble polymer is a saccharide.

3. The manufacturing method according to claim 2, wherein
    the saccharide is a water-soluble xylan or carboxymethyl cellulose (CMC).

4. The manufacturing method according to claim 1, wherein
    the ring structure is an aromatic ring, and the water-soluble polymer is sodium polystyrene sulfonate (PSS).

5. The manufacturing method according to claim 1, wherein the positive electrode active material has an olivine structure.

* * * * *